E. W. MOORE.
POWER TRANSMISSION APPARATUS.
APPLICATION FILED DEC. 22, 1911.
1,056,351.
Patented Mar. 18, 1913.
2 SHEETS—SHEET 1.
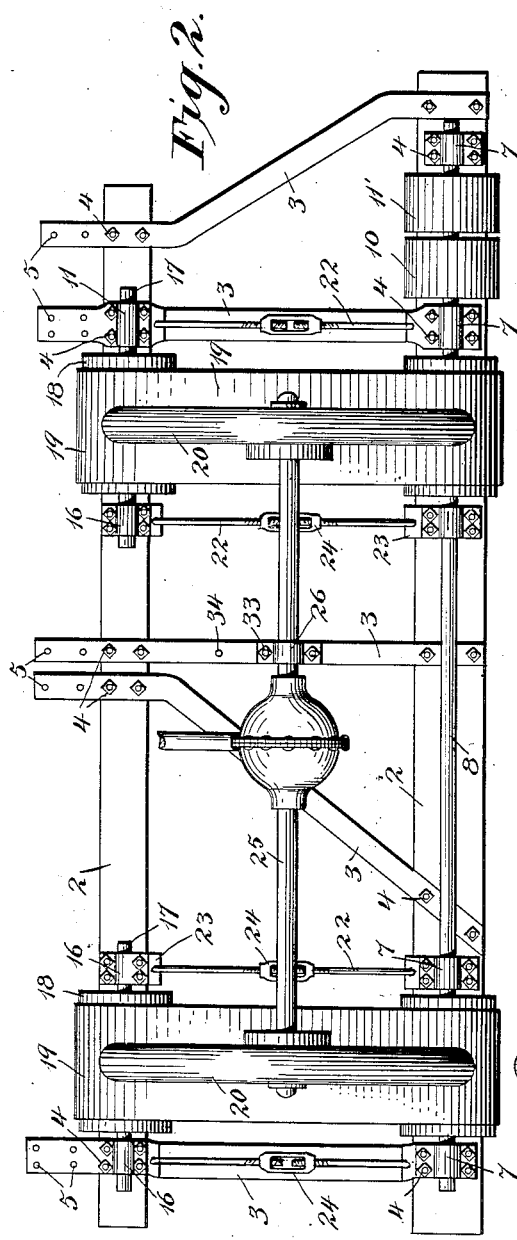
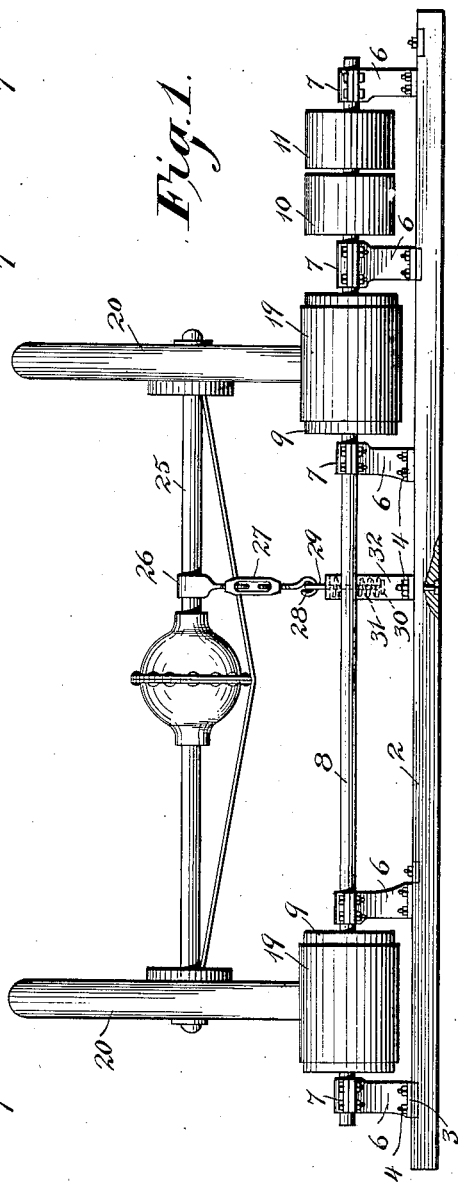
Witnesses:
Geo. L. Curtis
Geo. A. Skinner
Inventor:
Eugene W. Moore

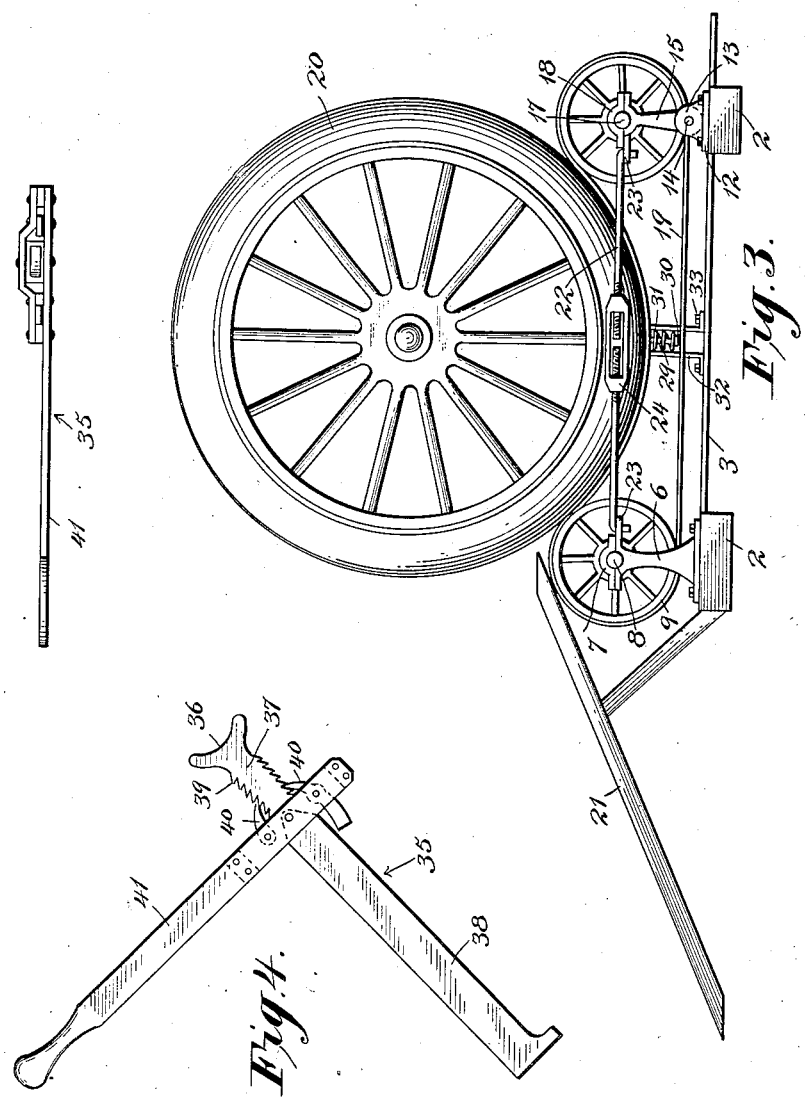

UNITED STATES PATENT OFFICE.

EUGENE W. MOORE, OF GARDENA, CALIFORNIA.

POWER-TRANSMISSION APPARATUS.

1,056,351.

Specification of Letters Patent. Patented Mar. 18, 1913.

Application filed December 22, 1911. Serial No. 667,419.

*To all whom it may concern:*

Be it known that I, EUGENE W. MOORE, a citizen of the United States, residing at Gardena, in the county of Los Angeles and State of California, have invented new and useful Improvements in Apparatus to be Used in Conjunction with an Automobile or Auto-vehicle for the Purpose of Transmission of Power.

This invention relates to power transmission apparatus, more particularly to improved apparatus adapted to derive power from the driving wheels of auto vehicles and transmit such power to other agencies, purposes and objects, for instance: to machinery to grind feed, wood sawing machinery, churning and pumping machinery, and other kinds of machinery which do not use more power than can be obtained from such auto vehicle.

Objects of the invention are to provide improved apparatus of the class specified which is simple in construction, compact in arrangement, strong and durable, adjustable to a high degree to insure efficiency in the operative connection of various sizes of driving wheels to the apparatus, easy and economical to install, maintain and operate, and effective in action.

Other objects and the advantages of the invention will be apparent to those skilled in the art from a consideration of the following description of the preferred form of construction embodying it, taken in connection with the accompanying drawings in which—

Figure 1 is a rear elevation of apparatus embodying the invention; Fig. 2 is a plan view of the same; Fig. 3 is a side elevation of the same; Fig. 4 is an elevation of the lifting jack; and Fig. 5 is a plan view of the same.

Suitable sills 2 are spaced apart and may be connected together in parallel by suitable crossbars 3 which may be secured to the sills by bolts 4. As shown, the crossbars 3 have at one end portion thereof a plurality of openings 5 for the bolts 4 in order that the sills 2 may be readily adjusted closer together or farther apart.

On one of the sills 2 are suitably affixed the standards 6 having thereon bearings 7 for the shaft 8 which has fast thereon the driving pulleys 9 and also power pulley 10, and loose pulley 11. On the other of the sills 2 may be suitably affixed the parts 12 each having thereon upstanding ears 13 between which on pivots 14 are mounted the lower end portion of arms 15 having on their upper end bearings 16 for the countershafts 11 on which are mounted pulleys 18 connected with the driving pulleys 9 by means of belts 19.

The driving wheels 20 of an auto vehicle may be run onto the belts 19 by means of inclined planks 21 which may extend to the rear of and be suitably connected with one of the sills 2.

In order to admit of spacing the standards 6 and arms 15 at the desired distance apart and to adjust the tension of the belts 19, rods 22 may have one end portion thereof offset and fitted into openings in lugs 23 on the standards 6 and arms 15, and they may have the other end portion thereof threaded and fitted into turnbuckles 24.

In order to exert an adjustable downward pull on the shaft 25 to yieldingly press the driving wheels 20 into frictional engagement with the belts 19, a hook 26 is removably fitted over the shaft 25 and has the lower threaded end thereof fitted in a turnbuckle 27 in which is fitted the upper threaded end of a hook 28 which is connected to the upper end of a rod 29 provided with a head 30 on its lower end adapted to engage one end of a spring 31 which spring has its other end bearing against the upper end portion of the upstanding bracket 32 which may be adjustably affixed by bolts 33 to one of the bars 3 having a plurality of openings 34 therein for the bolts 33.

The wheels 20 may be lifted into and out of position on the belts 19 by means of any suitable form of jack 35, that shown in Figs. 4 and 5 consisting of a head 36 adapted to fit against the axle 25 and having a stem 37 which is movably mounted on the standard 38 and provided on opposite sides thereof with teeth 39 between which are adapted to fit the pawls 40 which are pivotally mounted on the handle 41 which latter in turn is pivotally mounted at the upper end of the standard 38. It will be understood that when the handle 41 is moved in one direction one of the pawls 40 rides over the teeth 39 and the other of the pawls 40 engages with the teeth 39 and raises the head 36, and when the handle 41 is moved in the other direction the other of the pawls engages with the teeth 39 and raises the head 36.

I claim:

1. In apparatus of the class specified, the combination of sills, crosspieces adjustably connected between the sills, standards mounted on one of the sills, a power shaft mounted on said standards, driving pulleys on the shaft, parts provided with ears affixed on the other of the sills, arms having the lower end portions thereof arranged between and pivotally mounted on the ears, countershafts mounted at the upper ends of the arms, pulleys on the countershafts, belts connecting the pulleys on the countershafts with the driving pulleys, turnbuckles, and rods having one end thereof connected with the upper end portions of the arms and the standards and having the other end portions thereof threaded and fitted in the turnbuckles, substantially as described.

2. In apparatus of the class specified, the combination of sills, crosspieces adjustably connected between the sills, standards mounted on one of the sills, a power shaft mounted on said standards, driving pulleys on the shaft, parts provided with ears affixed on the other of the sills, arms having the lower end portions thereof arranged between and pivotally mounted on the ears, countershafts mounted at the upper ends of the arms, pulleys on the countershafts, belts connecting the pulleys on the countershafts with the driving pulleys, turnbuckles, rods having one end thereof connected with the upper end portions of the arms and the standards and having the other end portions thereof threaded and fitted in the turnbuckles, and adjustable means connected with one of the crosspieces and adapted to be connected with the shaft of the driving wheels of an auto vehicle to yieldingly press said wheels against said belts, substantially as described.

EUGENE W. MOORE.

Witnesses:
Geo. A. Skinner,
Annabel M. Evans.